(12) United States Patent
Ferencz et al.

(10) Patent No.: US 10,340,808 B2
(45) Date of Patent: Jul. 2, 2019

(54) REDUNDANT POWER SUPPLY APPARATUS

(71) Applicant: ACBEL POLYTECH INC., New Taipei (TW)

(72) Inventors: Andrew Ferencz, Southborough, MA (US); Qun Lu, Lexington, MA (US); Jui-Yang Chiu, New Taipei (TW); Hsuan-An Chen, New Taipei (TW); Chia-An Yeh, New Taipei (TW)

(73) Assignee: ACBEL POLYTECH INC., New Taipei (TW)

( * ) Notice: Subject to any disclaimer, the term of this patent is extended or adjusted under 35 U.S.C. 154(b) by 318 days.

(21) Appl. No.: 15/368,491

(22) Filed: Dec. 2, 2016

(65) Prior Publication Data

US 2017/0170733 A1 Jun. 15, 2017

Related U.S. Application Data

(60) Provisional application No. 62/267,093, filed on Dec. 14, 2015, provisional application No. 62/278,612, filed on Jan. 14, 2016.

(51) Int. Cl.
*H02M 3/33* (2006.01)
*H02M 3/335* (2006.01)
*H02M 7/493* (2007.01)
*H02J 9/06* (2006.01)

(52) U.S. Cl.
CPC ......... *H02M 3/33569* (2013.01); *H02J 9/061* (2013.01); *H02M 7/493* (2013.01)

(58) Field of Classification Search
CPC ................................................ H02M 3/33569

USPC .......................................................... 307/82
See application file for complete search history.

(56) References Cited

U.S. PATENT DOCUMENTS

| | | |
|---|---|---|
| 5,939,799 A | 8/1999 | Weinstein |
| 6,630,753 B2 | 10/2003 | Malik et al. |
| 2007/0210652 A1* | 9/2007 | Tracy ...................... H02J 9/062 307/66 |
| 2014/0077602 A1 | 3/2014 | Liu et al. |
| 2015/0123473 A1 | 5/2015 | Braylovskiy et al. |
| 2015/0200567 A1* | 7/2015 | Huang ..................... H02J 9/061 307/64 |
| 2015/0263566 A1* | 9/2015 | Kolhatkar ................. G05F 3/02 307/23 |
| 2016/0181865 A1* | 6/2016 | Hu .......................... H02M 1/12 307/66 |

* cited by examiner

*Primary Examiner* — Joseph Chang
(74) *Attorney, Agent, or Firm* — Lynette Wylie; Apex Juris, pllc.

(57) ABSTRACT

A redundant power supply apparatus includes at least two power inlets, at least two power supply units, and a common component. Each power inlet is connected to an AC power source. Each power supply unit has an input side and the at least two power supply units having a common output side, each input side is connected to the power inlet, and each power supply unit is configured to convert the AC power source into a DC power source. The common component is connected at the common output side and configured to receive DC power sources. Accordingly, the redundant power supply apparatus is provided to improve reliability of redundant operations between multiple external power sources without using mechanical switches.

11 Claims, 15 Drawing Sheets

REDUNDANT POWER SUPPLY APPARATUS

CROSS-REFERENCE TO RELATED APPLICATIONS

This application claims the benefit of two provisional applications, the first provisional application No. 62/267,093 field on Dec. 14, 2015 and the second provisional application No. 62/278,612 filed on Jan. 14, 2016, the disclosure of which is incorporated herein in its entirety by reference.

BACKGROUND

1. Technical Field

The present disclosure relates generally to a power supply apparatus, and more particularly to a redundant power supply apparatus.

2. Description of Related Art

Referring to FIG. 6, the related art in a field of redundant input power supply units typically connects multiple independent input power sources AC1, AC2 through a switching device 51 which selects one input power source as a primary input power source and other input power sources as secondary and tertiary, etc. input power sources for proper operation such that the input power source is received and converted by a power supply unit 52 to supply power to a power load of a server system, which is simply represented by a load 50. If the primary power source fails to meet certain criteria, the switching device 51 will disconnect from the primary power source, and the input power source that best meets the requirements for proper operation is selected. The requirements may be based on measured AC voltage or DC voltage, AC frequency, presence, or some other tracking means that allow instantaneous or near instantaneous determination of the ability to supply power as required by the system.

The switching device 51 can be electromechanical relays, semiconductor switches, or a combination of these devices. These systems typically require the input voltage to "break before make", i.e. be disconnected before connected for safety reasons as one requirement would be that the two or more power sources be fully independent of each other or a fault would occur. In other words, the two input power sources AC1, AC2 can never be directly or indirectly connected together through an electrical path, such as an ohmic path. If an uncontrolled current flows, a few dangerous situations will arise to the safety system engaging elements such as circuit breakers or fuses.

Also, it would be possible to put a live AC voltage on a connector that is not intended to have a live AC voltage such as the prongs of an AC line cord. International agencies also require certain design requirements to electrical devices that connect to public utilities that provide user safety and acceptance. The switching device 51 must also be able to transition from one input to another fast enough so the operation of the power converted is not disrupted, thereby providing a redundant system that works as a continuously functioning power supply. The switching device 51 that typically performs this function is often called an automatic voltage switch (AVS) or automatic transfer switch (ATS) or other terms that describe the same function.

U.S. Pat. No. 5,939,799 discloses an uninterruptible power supply with a transfer switch. Referring to FIG. 7, the transfer switch 63 is connected between two power sources, i.e., a first power source 61 and a second power source 62, and an AC/DC converter 64. The transfer switch 63 is controlled by a switch control 65 for selectively receiving the first power source 61 or the second power source 62 of said AC power.

U.S. Publication 2014/0077602 discloses a power supply system and a method for controlling the same. Referring to FIG. 8 and FIG. 9, a circuit switching module 73 is connected between two power sources, i.e., a first power source 71 and a second power source 72, and a controllable AC/DC conversion module 74. The circuit switching module 73 is controlled by a control module 75 such that the circuit switching module 73 is switched to the first power source 71 or the second power source 72.

U.S. Publication 2015/0123473 discloses an uninterruptable power supply for device having power supply modules with internal automatic transfer switches. Referring to FIG. 10, the automatic transfer switches (ATSs) 83 are connected to two AC power sources, i.e., a first AC power source 81 and a second AC power source 82, and further connected to a power factor correction 84 and a DC/DC converter 85. The ATSs 83 are controlled by a micro-controller unit (MCU) 86 to determine whether the first AC power source 81 or the second AC power source 82 is delivered to the power factor correction 84 and the DC/DC converter 85.

U.S. Pat. No. 6,630,753 discloses a low cost redundant AC to DC power supply. Referring to FIG. 11, two power sources, i.e., a first power source 91 and a second power source 92, are connected together after bridge rectifiers 93, 94 with a line selected and determined by silicon controller rectifiers (SCRs) 95, 96. A galvanic isolation between the two power sources 91, 92 is absent such that the system could only be used in a low cost controlled situation such that it needs to make a big effort to verify the safety of the system given the possibility of devices failing short circuit.

However, the foregoing transfer switch, switching module, and circuit switching module are often unreliable because of their mechanical construction and are subject to contact welding, limited operating temperature range, and mechanical failures much more than electrical components.

SUMMARY

An objective of the present disclosure is to provide a redundant power supply apparatus to solve the problem of unreliable operations due to advantages of mechanical switches used in a redundant power supply system.

In order to achieve the above-mentioned objective, the redundant power supply apparatus includes at least two power inlets, at least two power supply units, and a common component. Each power inlet is connected to an AC power source. Each power supply unit has an input side and the at least two power supply units have a common output side, each input side is connected to the power inlet, and each power supply unit is configured to convert the AC power source into a DC power source. The common component is connected to the common output side and configured to receive DC power sources.

Accordingly, the redundant power supply apparatus improves reliability of redundant operations between multiple external power sources without using mechanical switches.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
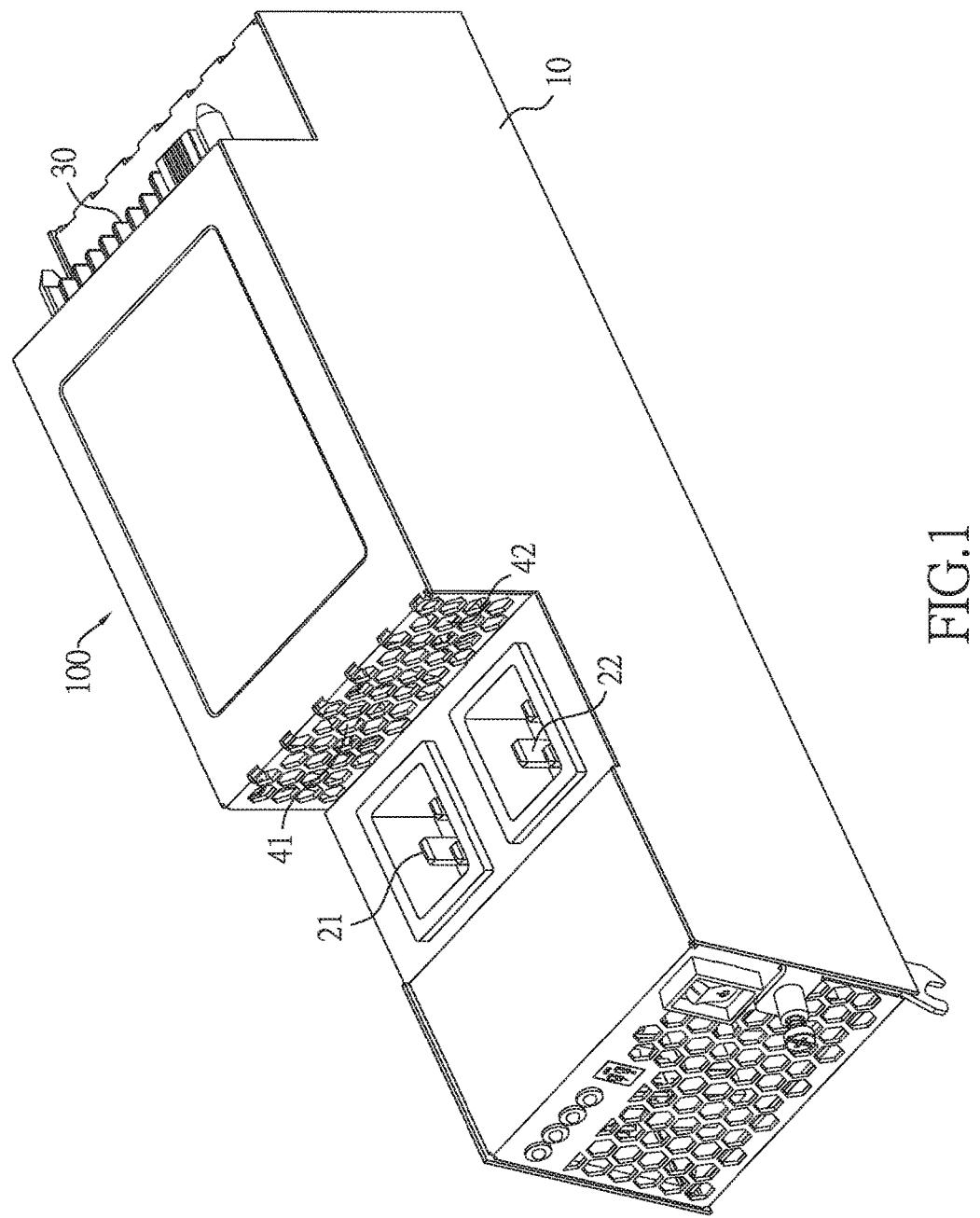
FIG. 1 is a schematic perspective external view of a redundant power supply apparatus according to the present disclosure.

Reference will now be made to the drawing figures to describe the present disclosure in detail.

Figure 2:
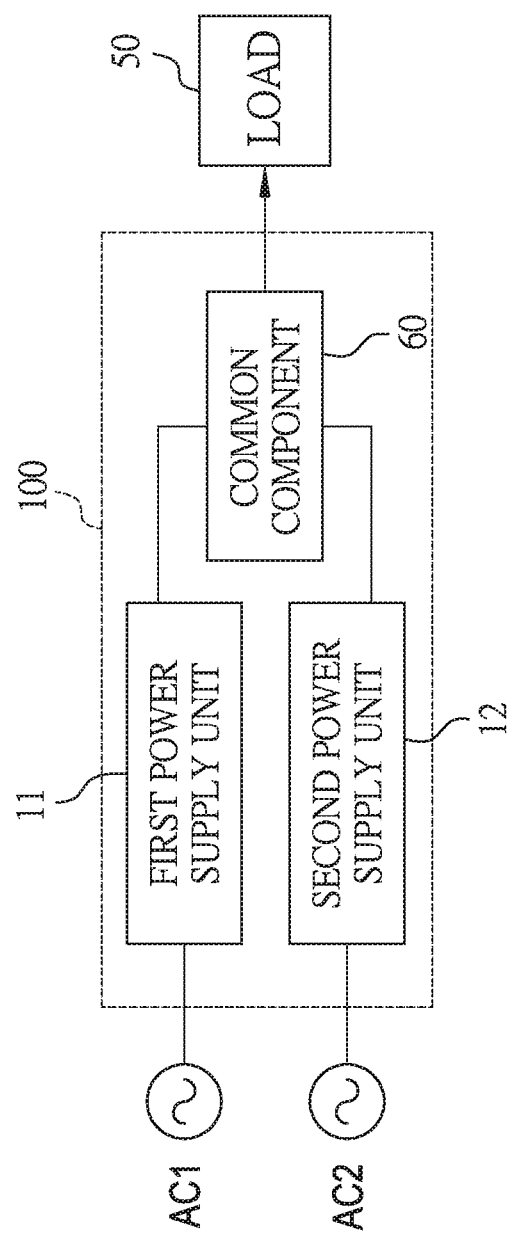
FIG. 2 is a schematic block diagram of the redundant power supply apparatus according to the present disclosure.

Referring to FIG. 1 and FIG. 2, a redundant power supply apparatus 100 includes a first power supply unit 11 and a second power supply unit 12 to supply the required power for a power load of a server system, which is simply represented by a load 50. The redundant power supply apparatus 100 is modularized such that the first power supply unit 11 and the second power supply unit 12 may be, but not limited to, mounted in a single enclosure 10, a single case, a single housing, or a single chassis. In particular, the first power supply unit 11 and the second power supply unit 12 are identical in circuit structure. The redundant power supply apparatus 100 further includes a first power inlet 21, a second power inlet 22, and a plurality of DC output terminals 30.

The first power supply unit 11 has an input side and an output side. The input side of the first power supply unit 11 is connected to the first power inlet 21, and the first power inlet 21 is electrically connected to a first alternating current (AC) power source AC1, wherein the first AC power source AC1 may be an external AC power source. Accordingly, the first power supply unit 11 receives the first AC power source AC1 and converts the first AC power source AC1 into a first direct current (DC) power source from the output side of the first power supply unit 11.

The second power supply unit 12 has an input side and an output side. The input side of the second power supply unit 12 is connected to the second power inlet 22, and the second power inlet 22 is electrically connected to a second alternating current (AC) power source AC2, wherein the second AC power source AC2 may be an external AC power source. Accordingly, the second power supply unit 12 receives the second AC power source AC2 and converts the second AC power source AC2 into a second direct current (DC) power source from the output side of the second power supply unit 12. Therefore, the two power sources AC1, AC2 enhance the reliability of power delivery.

In addition, the redundant power supply apparatus 100 further includes a heat-dissipating module. As shown in FIG. 1, the heat-dissipating module has a plurality of cooling fans 41, 42 corresponding to the first power supply unit 11 and the second power supply unit 12. The cooling fans 41, 42 are mounted inside the single enclosure 10 to remove the heat generated inside the single enclosure 10. For another example, the heat-dissipating module may be consisted of a plurality of heat sinks or other means corresponding to the two power supply units 11, 12 such that all components housed inside the single enclosure 10 operate below their maximum permissible temperature.

Figure 3A:
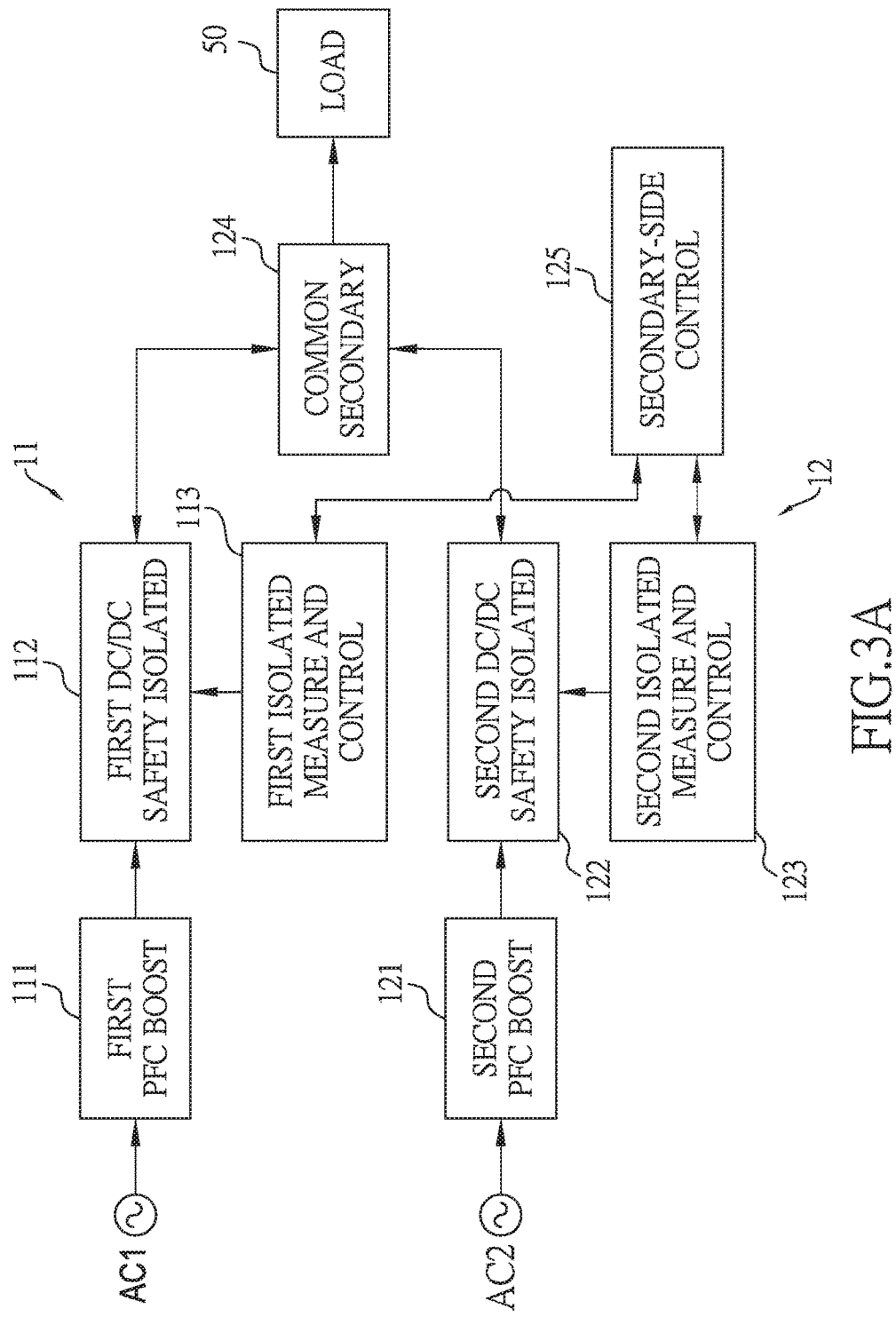
FIG. 3A is a schematic circuit block diagram of the redundant power supply apparatus according to a first embodiment of the present disclosure.
Figure 3B:
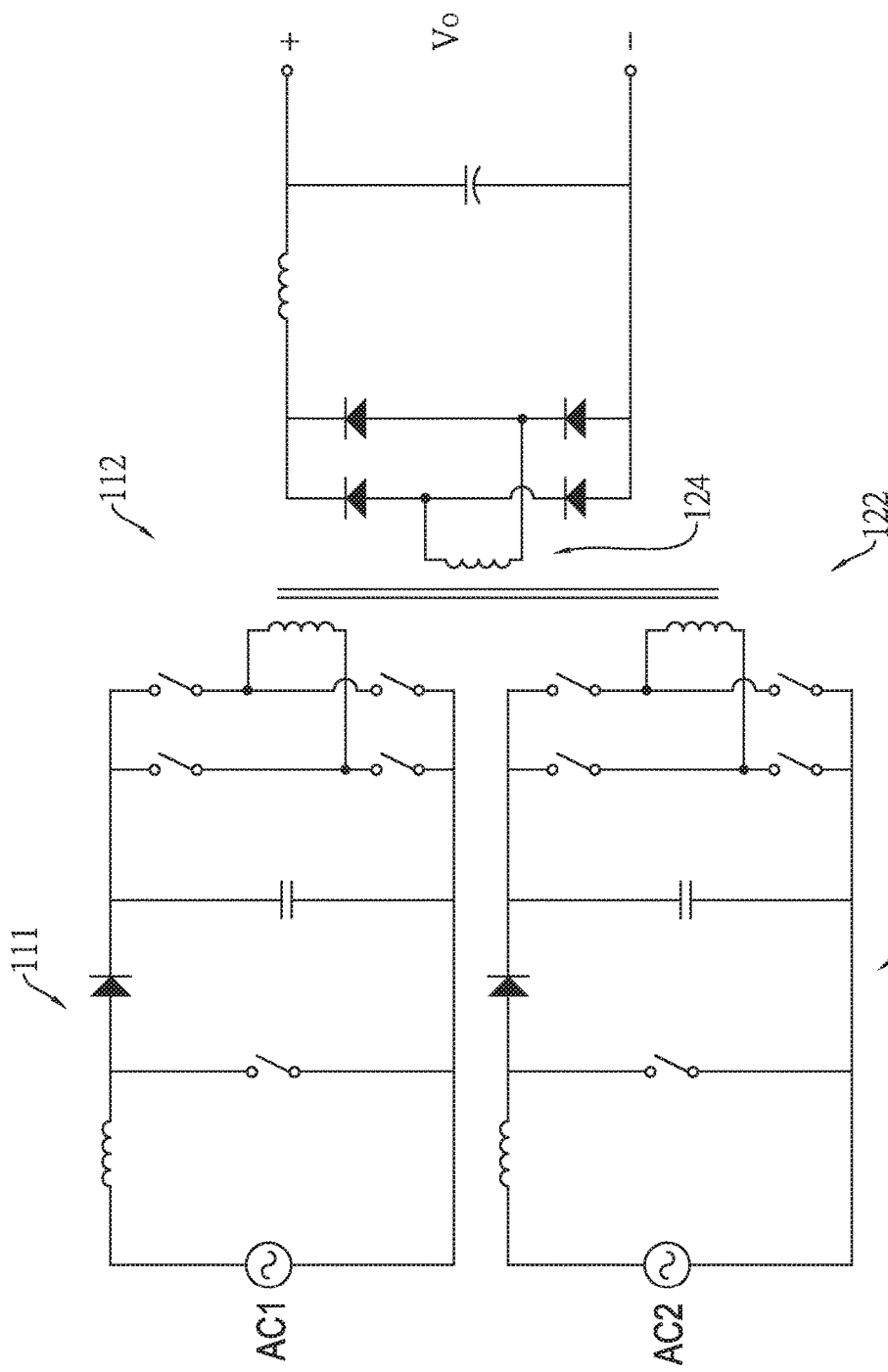
FIG. 3B is a circuit block diagram of an embodiment in FIG. 3A.

Referring to FIG. 3A and FIG. 3B, the first power supply unit 11 includes a first power factor correction (PFC) Boost 111, a first DC/DC safety isolated 112, and a first isolated measure and control 113. The second power supply unit 12 includes a second PFC Boost 121, a second DC/DC safety isolated 122, and a second isolated measure and control 123.

The first PFC Boost 111 has an input side and an output side. The input side of the first PFC Boost 111 forms the input side of the first power supply unit 11 to receive the first AC power source AC1. The second PFC Boost 121 has an input side and an output side. The input side of the second PFC Boost 121 forms the input side of the second power supply unit 12 to receive the second AC power source AC2.

As shown in FIG. 3B, a transformer with two primary-side windings and a secondary-side winding is fully isolated for safety requirement. The two primary-side windings are connected two-arm semiconductor switches to form the first DC/DC safety isolated 112 and the second DC/DC safety isolated 122, respectively. The secondary-side winding provides a common secondary 124 to provide a common output topology.

In this embodiment, the common secondary 124 is the common component 60, i.e., a secondary-side core (not shown) of the transformer and the secondary-side winding wound thereon form the common component 60. Also, the secondary-side winding, i.e., the common secondary 124 is connected to the secondary-side part of the DC/DC safety isolated to provide a common output path for supplying power to the load 50.

More specifically, the single enclosure 10 is connected to the two power sources AC1, AC2 by the corresponding power inlets 21, 22 so that the two power sources AC1, AC2 independently feed the first PFC Boost 111 and the second PFC Boost 121. The two PFC Boosts 111, 121 correspondingly feed the first DC/DC safety isolated 112 and the second DC/DC safety isolated 122 that have the common secondary 124 including energy storage and other required components, i.e., the secondary-side core and the secondary-side winding wound thereon, two-arm diodes, and an output rectified inductor and capacitor to support the load 50.

Further, a secondary-side control 125 is provided. The secondary-side control 125 is coupled to the first isolated measure and control 113 and the second isolated measure and control 123. For example, the secondary-side control 125 may be coupled to the first isolated measure and control 113 and the second isolated measure and control 123 by separate optical couplers corresponding to the two isolated measure and controls 113, 123.

The secondary-side control 125 may receive voltage or current information, such as, but not limited to, output voltages in accordance with conditions of the load 50, and input voltages of the first power supply unit 11 and the second power supply unit 12.

For example, the secondary-side control 125 controls the first isolated measure and control 113 and the second isolated measure and control 123 to respectively control the first power supply unit 11 and the second power supply unit 12 according to the received voltage, such as a common feedback output voltage. The first isolated measure and control 113 and the second isolated measure and control 123 correspondingly control the first DC/DC safety isolated 112 and the second DC/DC safety isolated 122 in PWM manners.

The secondary-side control 125 regulates the secondary-side voltage by means of the first DC/DC safety isolated 112 and the second DC/DC safety isolated 122 such that power from each could be separately controlled from 0 to 100% by the first isolated measure and control 113 and the second isolated measure and control 123, respectively. For example, the total energy storage required to support hold up time during normal operation is cut in half as each of the two power supply units 11, 12 can support 50% of the load 50.

For example, it is assumed that a rated output power of the first power supply unit 11 is 2000 watts and also a rated output power of the second power supply unit 12 is 2000 watts for supplying power to the load 50. In addition, it is assumed that the secondary-side control 125 of the redundant power supply apparatus 100 is provided to control the first power supply unit 11 via the first isolated measure and control 113 such that the first AC power source AC1 is converted by the first power supply unit 11 and then transmitted to the common output side and finally outputted via the common secondary 124 to supply power to the load 50.

At this time, the secondary-side control 125 controls the second power supply unit 12 via the second isolated measure and control 123 in a standby state (standby mode) such that the second AC power source AC2 is not completely converted by the second power supply unit 12, thus failing to be transmitted to the common output side. Therefore, the load 50 is supplied by the first power supply unit 11 rather than the second power supply unit 12.

When the first AC power source AC1 fails (losing power), the second power supply unit 12 jointly supplies power to the load 50. In this situation, the secondary-side control 125 controls the second power supply unit 12 such that the second AC power source AC2 is converted by the second power supply unit 12 and then transmitted to the common output side and finally outputted via the common secondary 124 to supply power to the load 50. At this time, the secondary-side control 125 controls the first power supply unit 11 in a standby state such that the first AC power source AC1 is not completely converted by the first power supply unit 11, thus failing to be transmitted to the common output side. Therefore, the load 50 is supplied by the second power supply unit 12 rather than the first power supply unit 11.

For another example, the redundant power supply apparatus 100 may be operated when both the first AC power source AC1 and the second AC power source AC2 are normal. Both the first power supply unit 11 and the second power supply unit 12 may provide an output power between 0 and 100% of the rated output power thereof. By power sharing of the first AC power source AC1 and the second AC power source AC2, the first power supply unit 11 and the second power supply unit 12 jointly provide the required power for the load 50 according to the power contribution thereof.

Further, either the first power supply unit 11 or the second power supply unit 12 may provide its output power for the load 50 by controlling an OR'ing switch thereof when both the first AC power source AC1 and the second AC power source AC2 are normal. The second power supply unit 12 is operated under a standby mode when the first power supply unit 11 is operated to output power, and vice versa.

For example, semiconductor switches of the first DC/DC safety isolated 112 are controlled in a switching operation and semiconductor switches of the second DC/DC safety isolated 122 are controlled in an turn-off state, thereby completely supplying power to the load 50 by the first power supply unit 11. In contrast, the semiconductor switches of the second DC/DC safety isolated 122 are controlled in a switching operation and the semiconductor switches of the first DC/DC safety isolated 112 are controlled in a turn-off state, thereby completely supplying power to the load 50 by the second power supply unit 12.

In addition, the semiconductor switches of the first DC/DC safety isolated 112 and the semiconductor switches of the second DC/DC safety isolated 122 are both controlled in the switching operations, thereby jointly supplying power to the load 50 by the first and second power supply units 11, 12.

Figure 3C:
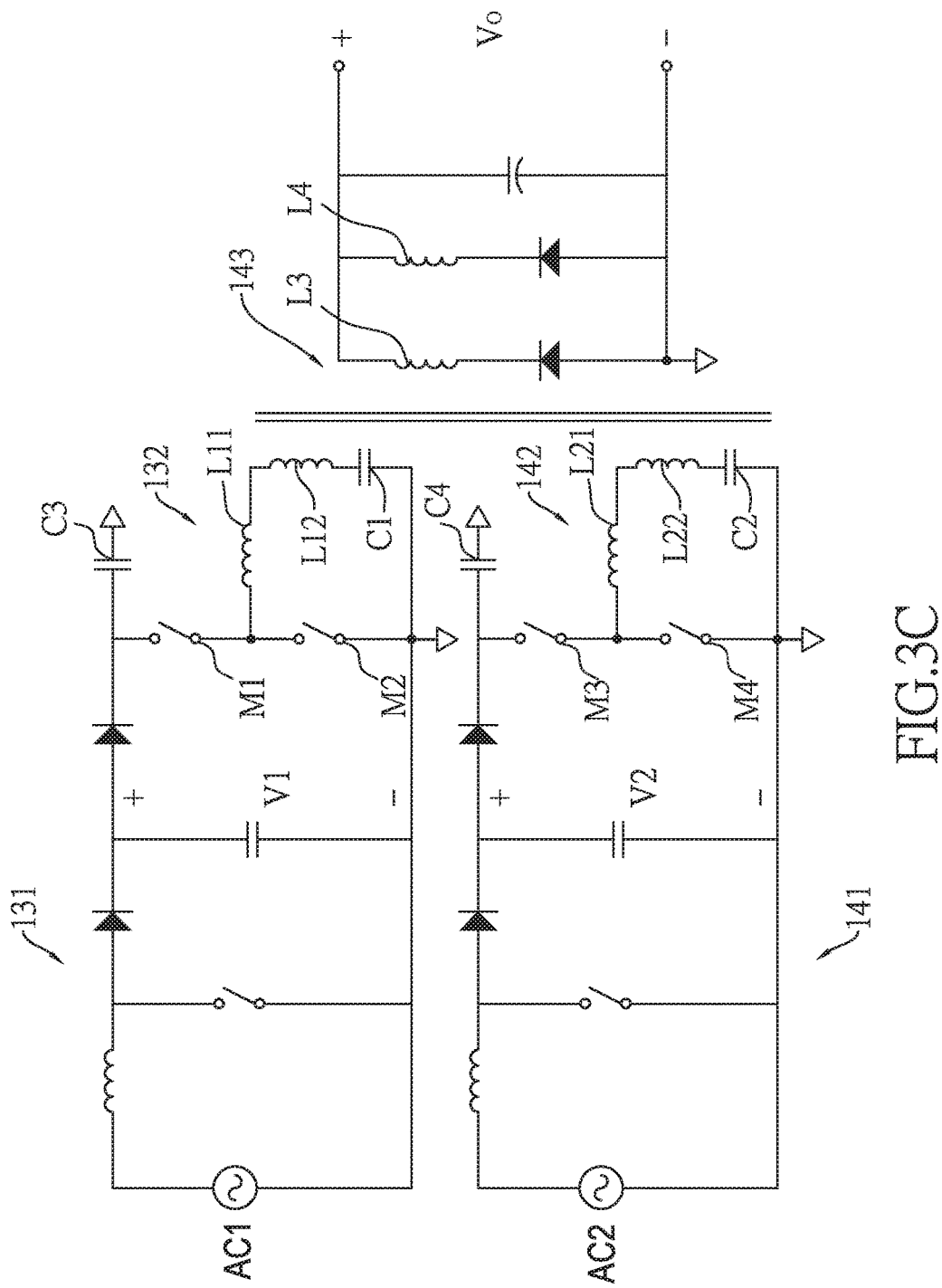
FIG. 3C is a circuit block diagram of another embodiment in FIG. 3A.

Referring to FIG. 3A and FIG. 3C, this embodiment covers a DC/DC topology that may have two or more primary-side circuits and one secondary-side circuit for sharing power or providing redundant power in an LLC topology. The first power supply unit 11 includes a first PFC Boost 131 and a first LLC DC/DC converter 132. The second power supply unit 12 includes a second PFC Boost 141 and a second LLC DC/DC converter 142. In this embodiment, the first isolated measure and control 113, the second isolated measure and control 123, and the secondary-side control 125 shown in FIG. 3A are also provided for controlling the first LLC DC/DC converter 132 and the second LLC DC/DC converter 142. The first PFC Boost 131 has an input side and an output side. The input side of the first PFC Boost 131 forms the input side of the first power supply unit 11 to receive the first AC power source AC1. The second PFC Boost 141 has an input side and an output side. The input side of the second PFC Boost 141 forms the input side of the second power supply unit 12 to receive the second AC power source AC2.

The embodiment provides redundant input power connection to smoothly provide the remaining power source if one input power source is removed, thereby enhancing the reliability of power delivery. The embodiment allows for a smooth transition from a dual input to single input using energy storage at the input of the LLC DC/DC converters 132, 142 to gradually move power from both AC power sources to just one AC power source. Also by controlling the regulated DC voltage of either input of the LLC DC/DC converters 132, 142, the power supplied by either input can be controlled to permit sharing of power based on the users' requirements.

The first LLC DC/DC converter 132 is connected to the regulated output side of the first PFC Boost 131, and the second LLC DC/DC converter 142 is connected to the regulated output side of the second PFC Boost 141. The embodiment also reduces total required components and simplifies control designs required to provide a redundant power supply as a secondary side (output side) of a single transformer used by the both AC power sources AC1, AC2.

As shown in FIG. 3C, the first LLC DC/DC converter 132 and the second LLC DC/DC converter 142 share one transformer identified as coupled inductors L12, L22, L3, L4. These four inductors L12, L22, L3, L4 are four windings wound on a common ferrite core. Each input of the LLC DC/DC converters 132, 142 has its independent capacitors C3, C4 for energy storage.

The two capacitors C3, C4 are respectively supplied by a first capacitor voltage V1 and a second capacitor V2, wherein the first capacitor voltage V1 is an output voltage of the first PFC Boost 131 and the second capacitor voltage V2 is an output voltage of the second PFC Boost 141.

Diodes connected to the capacitors C3, C4 represent a means to prevent power flow from the output side to the input side, wherein the diodes may be common components of the PFC Boosts 131, 141 or may be added if required. Each LLC DC/DC converter has two switches, i.e., the two LLC DC/DC converters 132, 142 provide two switching circuits, which may be typically switched at 50% duty cycle. In which, the first LLC DC/DC converter 132 has two switches M1, M2 and the second LLC DC/DC converter 142 has two switches M3, M4.

In this embodiment, the switch M1 and the switch M3 are driven with the same signal as the switch M2 and the switch M4. Also, the switch M1 and the switch M2 or the switch M3 and the switch M4 no longer are switched if the input power is removed. In normal operation, the two LLC DC/DC converters 132, 142 operate in parallel and share power if the first capacitor voltage V1 and the second capacitor voltage V2 are at the same potential. The inherent nature of each LLC DC/DC converter has finite impedance so that current and power sharing depend on the values of the elements, which can be controlled by design.

In this embodiment, only one secondary (output) side is required so as to use fewer components than if one were to make two fully separate power supply units. This embodiment allows combining power sources with fewer components by combining the power at the DC/DC isolated transformer allowing a single secondary set of components and windings.

The LLC DC/DC converter design operated above resonance has a load impedance such that higher output current at the load 50 results in lower output voltage. Circuits have a finite load impedance that may be represented by an output resistance in series with a voltage source and have a natural ability to share current. The independent primary-side resonant inductance provided from a multiple-winding LLC DC/DC converter may be a physical inductor or resulting from leakage inductance in the transformer of the LLC DC/DC converter. This property allows multiple primary-side windings with switching circuits that are controlled by the same PWM signal so they act in parallel. In this embodiment, the secondary-side control 125 as shown in FIG. 3A may control the first isolated measure and control 113 and the second isolated measure and control 123 to stop switching a primary side partially or fully to detach one input power source.

In this embodiment, the voltage at the primary-side of each LLC DC/DC converter may be separately regulated to control the percentage of power from each power source. The turn ratio of the primary and resonant values may be adjusted so that two inputs of different voltages would share power equally. The two primary-side circuits may be fully isolated from each other and each primary-side circuit may provide auxiliary power, which is also redundant.

In this embodiment, the secondary-side control 125 requires only one feedback signal and means to control switching behavior of the LLC DC/DC converters 132, 142. For example, a frequency control, duty-cycle control, or hysteretic on/off control, independently or identically to two or more primary-side switches M1-M4 according to two primary-side DC voltages, i.e., the capacitor voltages V1, V2.

Figure 4A:
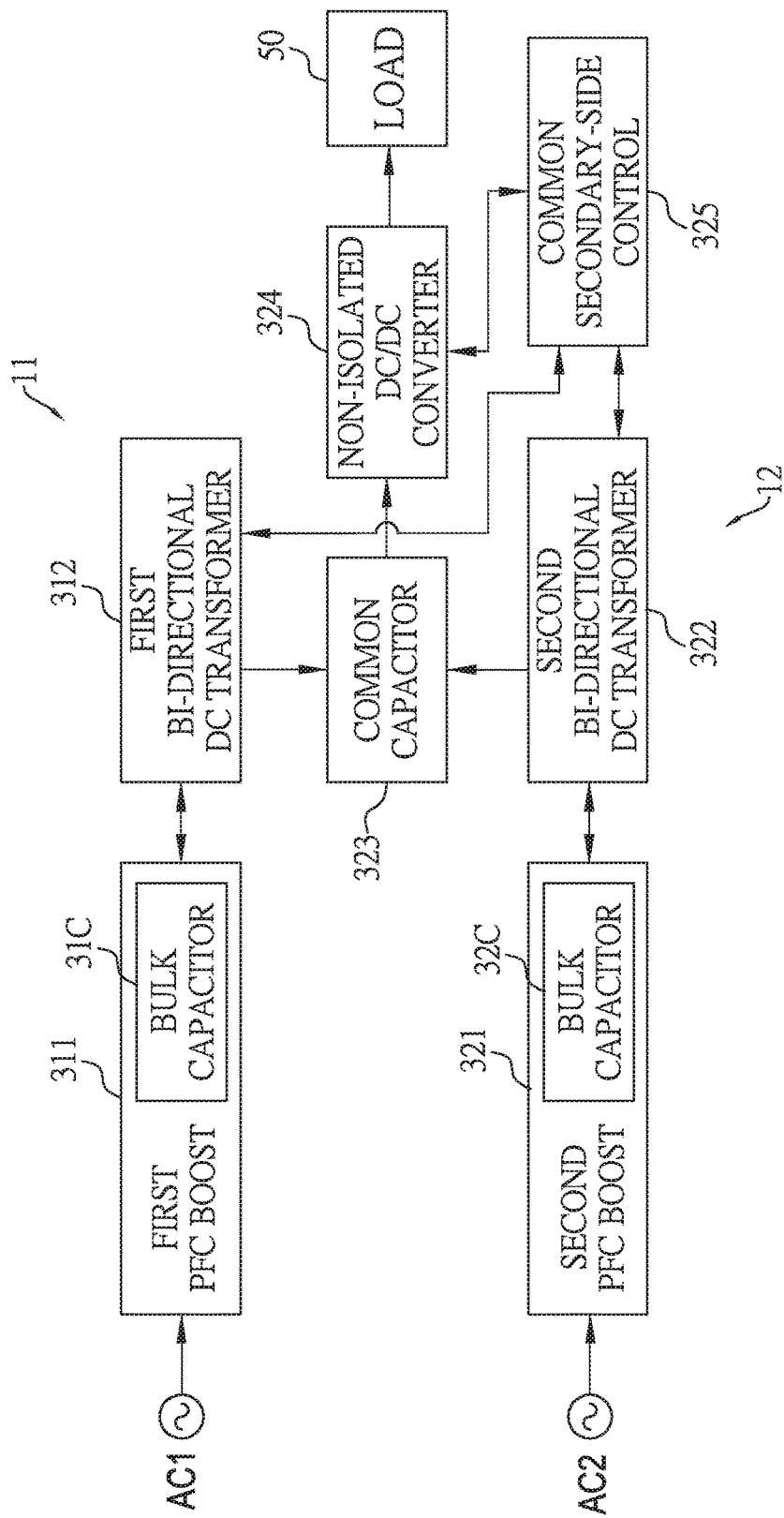
FIG. 4A is a schematic circuit block diagram of the redundant power supply apparatus according to a second embodiment of the present disclosure.
Figure 4B:
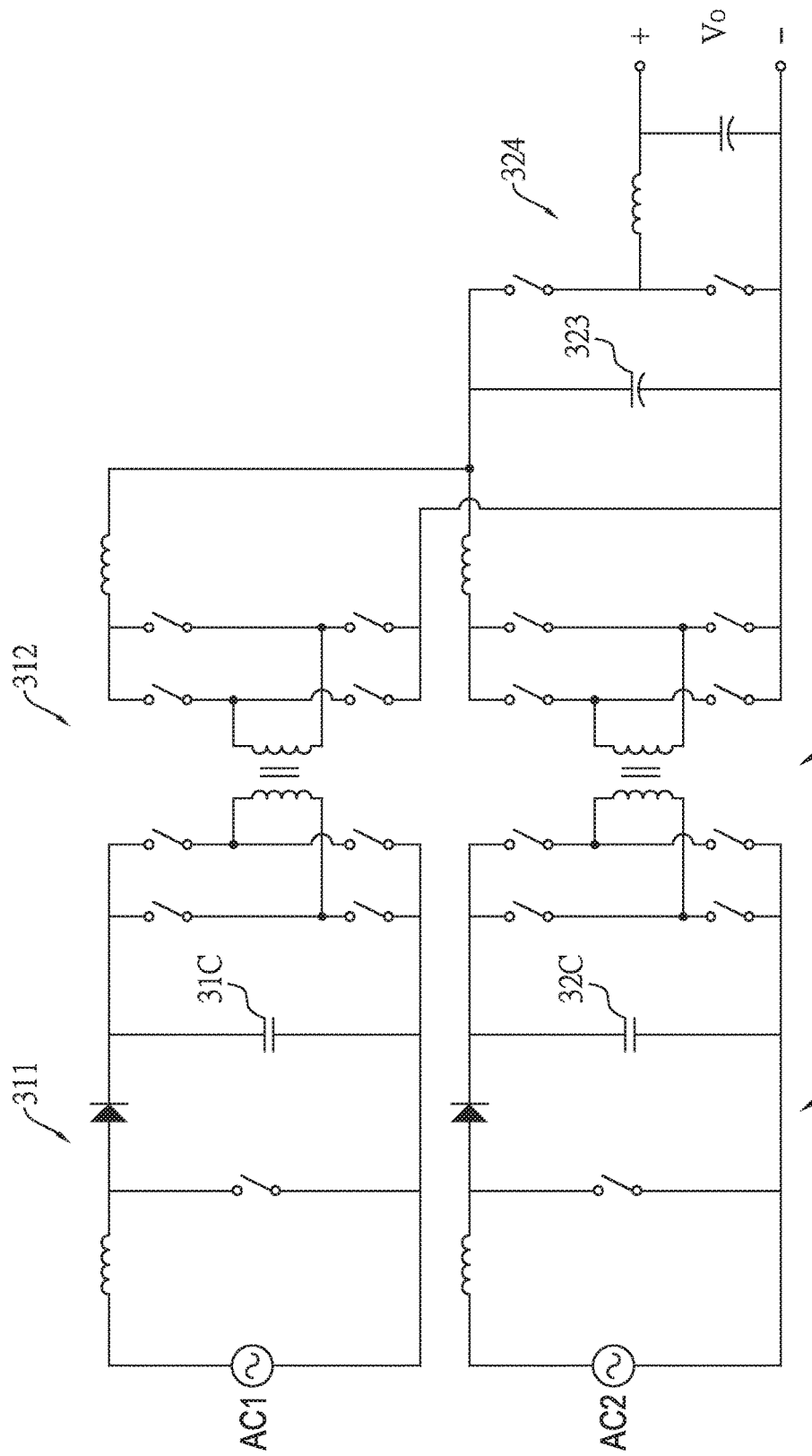
FIG. 4B is a circuit block diagram of the redundant power supply apparatus in FIG. 4A.

Referring to FIG. 4A and FIG. 4B, the first power supply unit 11 includes a first PFC Boost 311 with a Bulk capacitor 31C and a first bi-directional DC transformer 312. The second power supply unit 12 includes a second PFC Boost 321 with a Bulk capacitor 32C and a second bi-directional DC transformer 322. In general, said DC transformer is used to receive a DC voltage, convert the DC voltage into a high-frequency AC voltage, and then convert the high-frequency AC voltage into another DC voltage.

The first PFC Boost 311 has an input side and an output side. The input side of the first PFC Boost 311 forms the input side of the first power supply unit 11 to receive the first AC power source AC1. The first bi-directional DC transformer 312 has an input side and an output side. The output side of the first bi-directional DC transformer 312 forms the output side of the first power supply unit 11 to output the first DC power source. The input side of the first bi-directional DC transformer 312 is connected to the output side of the first PFC Boost 311 in series.

The second PFC Boost 321 has an input side and an output side. The input side of the second PFC Boost 321 forms the input side of the second power supply unit 12 to receive the second AC power source AC2. The second bi-directional DC transformer 322 has an input side and an output side. The output side of the second bi-directional DC transformer 322 forms the output side of the second power supply unit 12 to output the second DC power source. The input side of the second bi-directional DC transformer 322 is connected to the output side of the second PFC Boost converter 321 in series.

More specifically, the single enclosure 10 is connected to the two power sources AC1, AC2 by the corresponding power inlets 21, 22 so that the two power sources AC1, AC2 independently feed the first PFC Boost 311 and the second PFC Boost 321. The two PFC Boosts 311, 321 correspondingly feed the first bi-directional DC transformer 312 and the second bi-directional DC transformer 322. Each Bulk capacitor 31C, 32C is connected to one side of the corresponding bi-directional DC transformer 312, 322 with the other side connected to the common capacitor 323 which typically has much less total energy storage than either the Bulk capacitor 31C, 32C.

In addition, a bi-directional power transmission between the first bi-directional DC transformer 312 and the second bi-directional DC transformer 322 may be implemented. That is, the power outputted from the first power supply unit 11 may be transmitted to the second power supply unit 12 via the second side of the second bi-directional DC transformer 322. Also, the power outputted from the second power supply unit 12 may be transmitted to the first power supply unit 11 via the second side of the first bi-directional DC transformer 312.

More specifically, the Bulk capacitor 31C of the first PFC Boost 311 may further store energy transmitted from the second power supply unit 12 via the first bi-directional DC transformer 312. Similarly, the Bulk capacitor 32C of the second PFC Boost 321 may further store energy transmitted from the first power supply unit 11 via the second bi-directional DC transformer 322. Therefore, the energy stored in the two Bulk capacitors may be shared to each other via the two bi-directional DC transformers 312, 322.

The output side of the first power supply unit 11, i.e., the output side of the first bi-directional DC transformer 312 is connected to the output side of the second power supply unit 12, i.e., the output side of the second bi-directional DC transformer 322. Accordingly, the first power supply unit 11 and the second power supply unit 12, which have an input-independent configuration, are connected together at the output sides thereof to form a common output side.

The redundant power supply apparatus 100 further includes a common capacitor 323 and a non-isolated DC/DC converter 324 connected to the common capacitor 323 in series. The common capacitor 323 is connected to the first bi-directional DC transformer 312 and the second bi-directional DC transformer 322. In this embodiment, the common capacitor 323 is the common component 60 for storing energy outputted from the first power supply unit 11 and the second power supply unit 12. The input side of the common capacitor 323 is commonly connected to the output sides of the two bi-directional DC transformers 312, 322. The output side of the common capacitor 323 is connected to the input side of the non-isolated DC/DC converter 324 to prove the regulated DC output voltage Vo is to power the load 50. For example, the non-isolated DC/DC converter 324 may be a buck converter as shown in FIG. 5B. The output side of the non-isolated DC/DC converter 324 is an output side of the redundant power supply apparatus 100 to provide a DC output voltage Vo to supply power to the load 50.

Further, a common secondary-side control 325 is provided. The common secondary-side control 325 is coupled to the first bi-directional DC transformer 312, the second bi-directional DC transformer 322, and the non-isolated DC/DC converter 324. The common secondary-side control 325 is used to control the non-isolated DC/DC converter 324 to regulate the DC output voltage Vo. Further, the common secondary-side control 325 further controls the first bi-directional DC transformer 312 and the second bi-directional DC transformer 322 in PWM manners according to the received voltage, such as a common feedback output voltage.

More specifically, the two bi-directional DC transformers 312, 322 provide DC to DC operations so that each of the parallel supplies are bi-directional and unregulated from the AC side Bulk capacitors 31C, 32C through to the isolated and rectified DC side. It is a further enhancement of the embodiment shown in FIG. 3A and FIG. 3B in that the energy storage can be reduced by having both converters share energy of the Bulk capacitor of the other. Each PFC Boost 311, 321 provides a rough means of regulation of the Buck capacitor 31C, 32C. This isolated and rectified supply is further regulated by means of the non-isolated DC/DC converter 324.

The safety isolation from one power source to the other power source is by means of a fully safety isolated transformer as opposed to mechanical or electrical switches, further enhancing the operator safety in the installation and operation of the present disclosure. The common capacitor 323 required provides interim energy storage for loss of input power either through transitions from one active line to another or due to that normal expected disturbances to the input power is reduced in total since the two bi-directional DC transformers 312, 322 effectively parallel the high-voltage Bulk capacitors 31C, 32C of either AC to DC supply.

The prior arts all require additional capacitors in total due to the transfer switch time and the inability to share the 'hold up' or buck high voltage capacitors. In this embodiment, it allows a reduction of the hold up capacitor for each AC to DC section to be reduced by a significant cost and size reduction. Also, the bi-directional DC transformers 312, 322 make near ideal use of semiconductor components so the efficiency of DC/DC transformers are usually the highest of any topology. The extra implementation of the DC transformer is not specified but includes any unregulated topology and switch timing that result in the transfer of DC voltage and current across an isolation barrier.

For example, it is assumed that a rated output power of the first power supply unit 11 is 2000 watts and also a rated output power of the second power supply unit 12 is 2000 watts for supplying power to the load 50. In addition, it is assumed that the common secondary-side control 325 of the redundant power supply apparatus 100 is provided to control the first power supply unit 11 such that the first AC power source AC1 is converted by the first power supply unit 11 and then transmitted to the common output side and finally outputted via the common capacitor 323 and the non-isolated DC/DC converter 324 to supply power to the load 50.

At this time, the common secondary-side control 325 controls the second power supply unit 12 in a standby state such that the second AC power source AC2 is not completely converted by the second power supply unit 12, thus failing to be transmitted to the common output side. Therefore, the load 50 is supplied by the first power supply unit 11 rather than the second power supply unit 12.

When the first AC power source AC1 fails (losing power), the second power supply unit 12 jointly supplies power to the load 50. In this situation, the common secondary-side control 325 controls the second power supply unit 12 such that the second AC power source AC2 is converted by the second power supply unit 12 and then transmitted to the common output side and finally outputted via the common capacitor 323 and the non-isolated DC/DC converter 324 to supply power to the load 50. At this time, the common secondary-side control 325 controls the first power supply unit 11 in a standby state such that the first AC power source AC1 is not completely converted by the first power supply unit 11, thus failing to be transmitted to the common output side. Therefore, the load 50 is supplied by the second power supply unit 12 rather than the first power supply unit 11.

For another example, the redundant power supply apparatus 100 may be operated when both the first AC power source AC1 and the second AC power source AC2 are normal. Both the first power supply unit 11 and the second power supply unit 12 may provide an output power between 0 and 100% of the rated output power thereof. By power sharing of the first AC power source AC1 and the second AC power source AC2, the first power supply unit 11 and the second power supply unit 12 jointly provide the required power for the load 50 according to the power contribution thereof.

Further, either the first power supply unit 11 or the second power supply unit 12 may provide its output power for the load 50 by controlling an OR'ing switch thereof when both the first AC power source AC1 and the second AC power source AC2 are normal. The second power supply unit 12 is operated under a standby mode when the first power supply unit 11 is operated to output power, and vice versa.

For example, semiconductor switches of the first bi-directional DC transformer 312 are controlled in a switching operation and semiconductor switches of the second bi-directional DC transformer 322 are controlled in a turn-off state, thereby completely supplying power to the load 50 by the first power supply unit 11. In contrast, the semiconductor switches of the second bi-directional DC transformer 322 are controlled in a switching operation and the semiconductor switches of the first bi-directional DC transformer 312 are controlled in a turn-off state, thereby completely supplying power to the load 50 by the second power supply unit 12.

In addition, the semiconductor switches of the first bi-directional DC transformer 312 and the semiconductor switches of the second bi-directional DC transformer 322 are both controlled in the switching operations, thereby jointly supplying power to the load 50 by the first and second power supply units 11, 12.

Figure 5A:
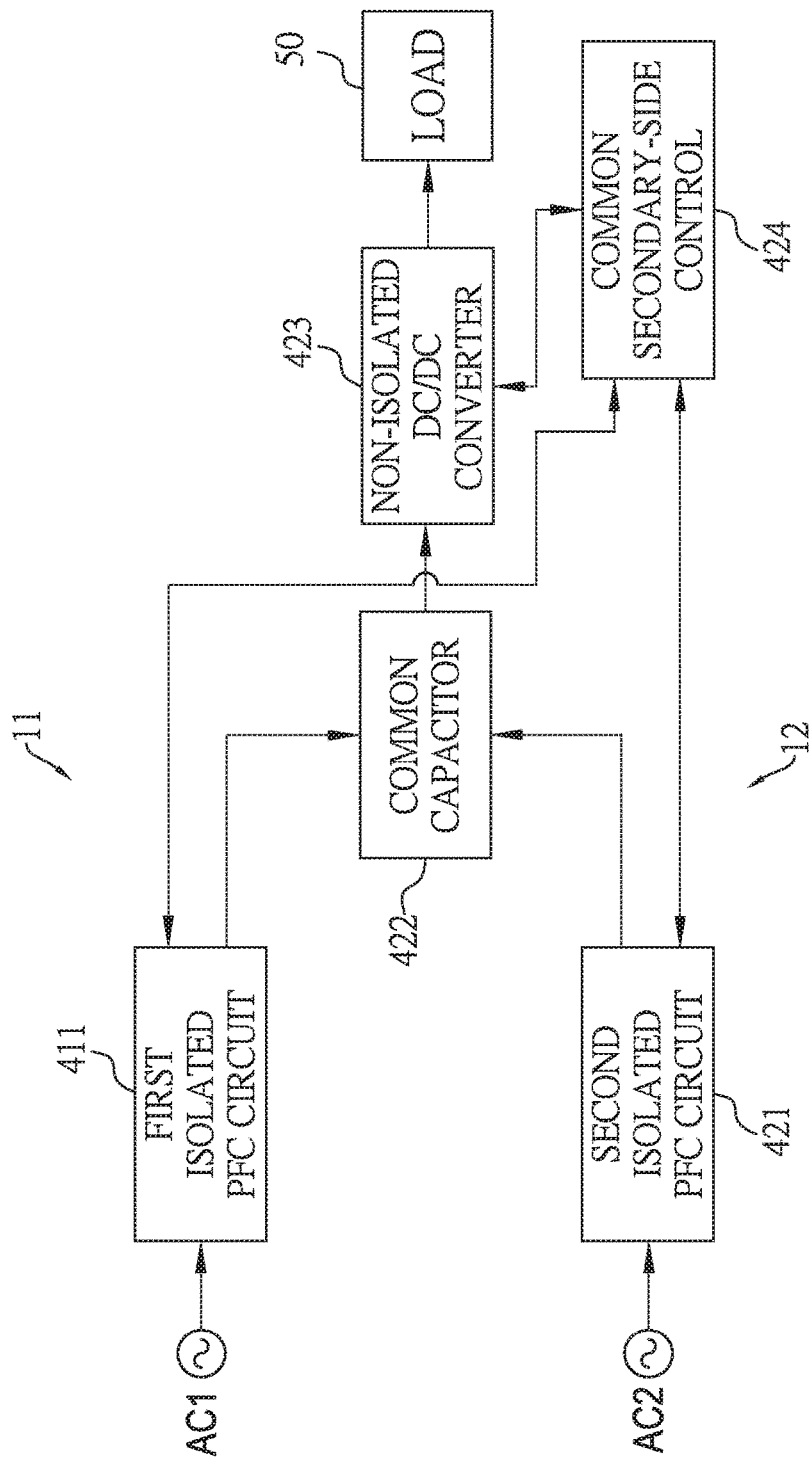
FIG. 5A is a schematic circuit block diagram of the redundant power supply apparatus according to a third embodiment of the present disclosure.
Figure 5B:
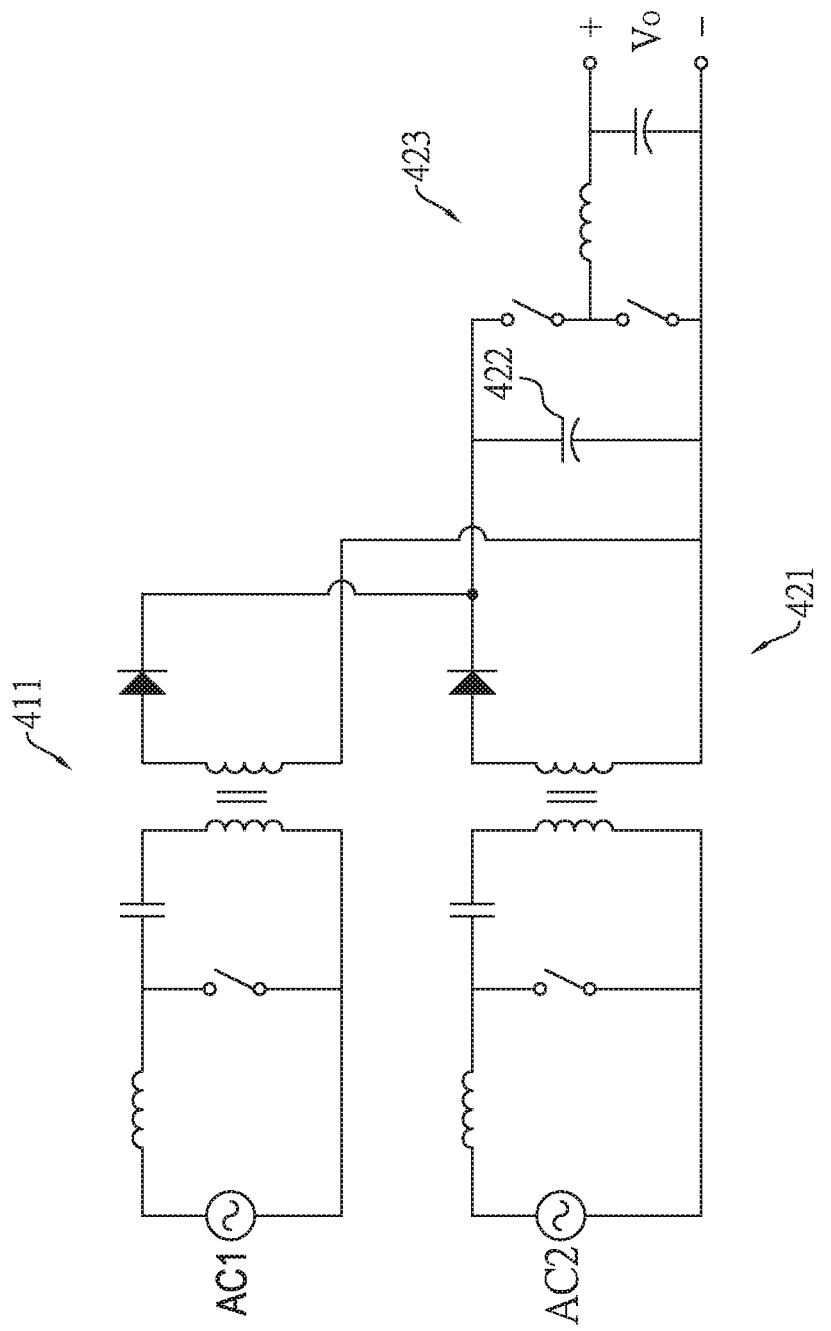
FIG. 5B is a circuit block diagram of the redundant power supply apparatus in FIG. 5A.

Referring to FIG. 5A and FIG. 5B, the first power supply unit 11 has a first isolated PFC circuit 411. The second power supply unit 12 has a second isolated PFC circuit 421. In this embodiment, each isolated PFC circuit 411, 421 may be an isolated Ćuk converter. Besides, other types of isolated PFC converters, such as flyback, may be used in the present disclosure.

The first isolated PFC circuit 411 has an input side and an output side. The input side of the first isolated PFC circuit 411 forms the input side of the first power supply unit 11 to receive the first AC power source AC1. The output side of the first isolated PFC circuit 411 forms the output side of the first power supply unit 11 to output the first DC power source.

The second isolated PFC circuit 421 has an input side and an output side. The input side of the second isolated PFC circuit 421 forms the input side of the second power supply unit 12 to receive the second AC power source AC2. The output side of the second isolated PFC circuit 421 forms the output side of the second power supply unit 12 to output the second DC power source.

The single enclosure 10 is connected to the two power sources AC1, AC2 by the corresponding power inlets 21, 22 so that the two power sources AC1, AC2 independently feed the first PFC circuit 411 and the second isolated PFC circuit 421. The output side of the first power supply unit 11, i.e., the output side of the first isolated PFC circuit 411 is connected to the output side of the second power supply unit 12, i.e., the output side of the second isolated PFC circuit 421. Accordingly, the first power supply unit 11 and the second power supply unit 12, which have an input-independent configuration, are connected together at the output sides thereof to form a common output side.

Figure 6:
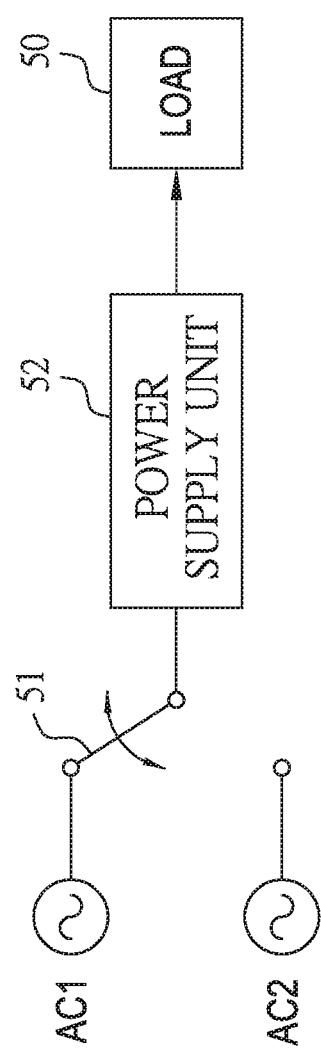
FIG. 6 is a schematic block diagram of a conventional redundant power supply.
Figure 7:
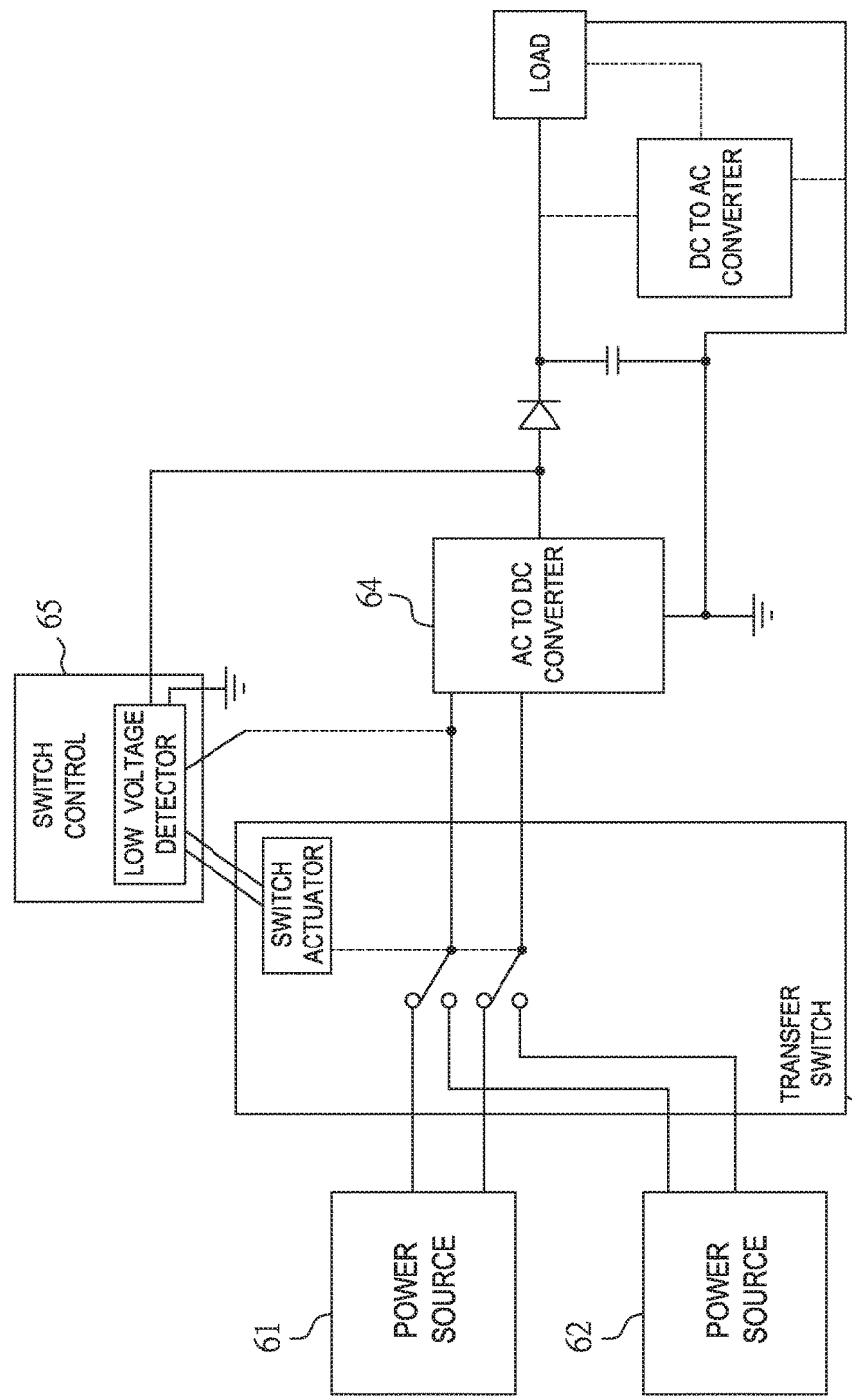
FIG. 7 is a circuit block diagram of a conventional uninterruptible power supply.
Figure 8:
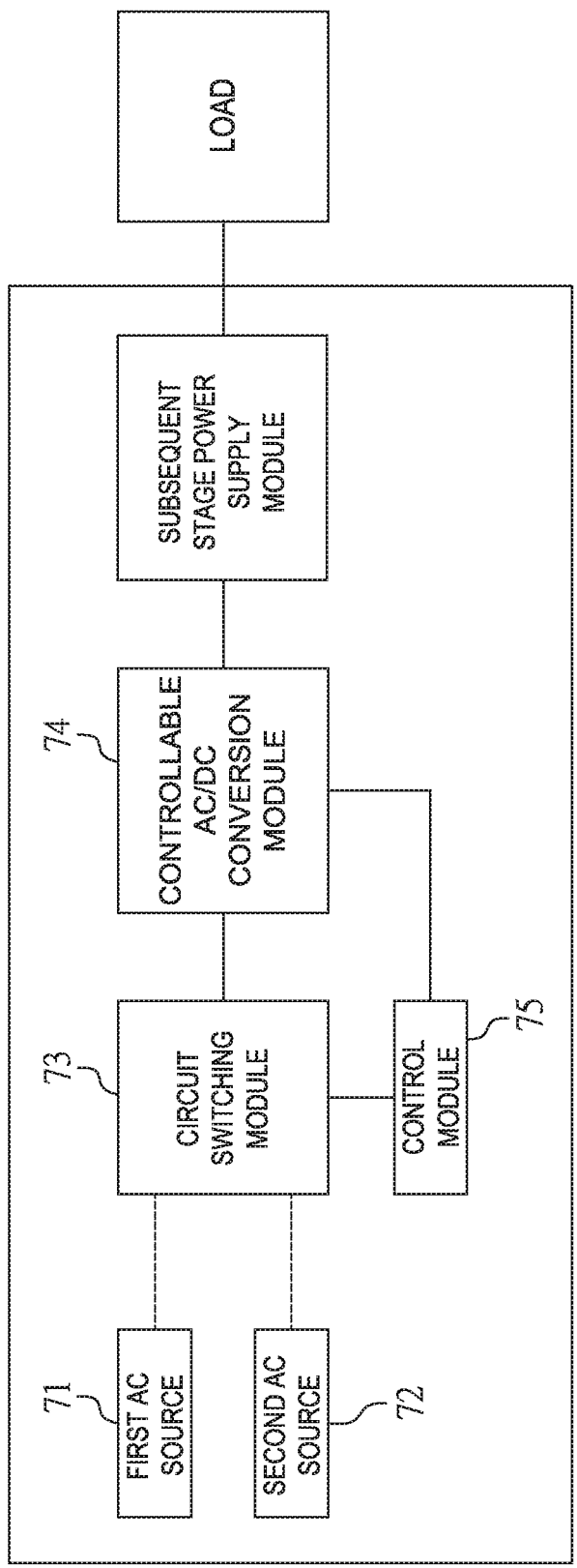
FIG. 8 is a circuit block diagram of a conventional power supply system.
Figure 9:
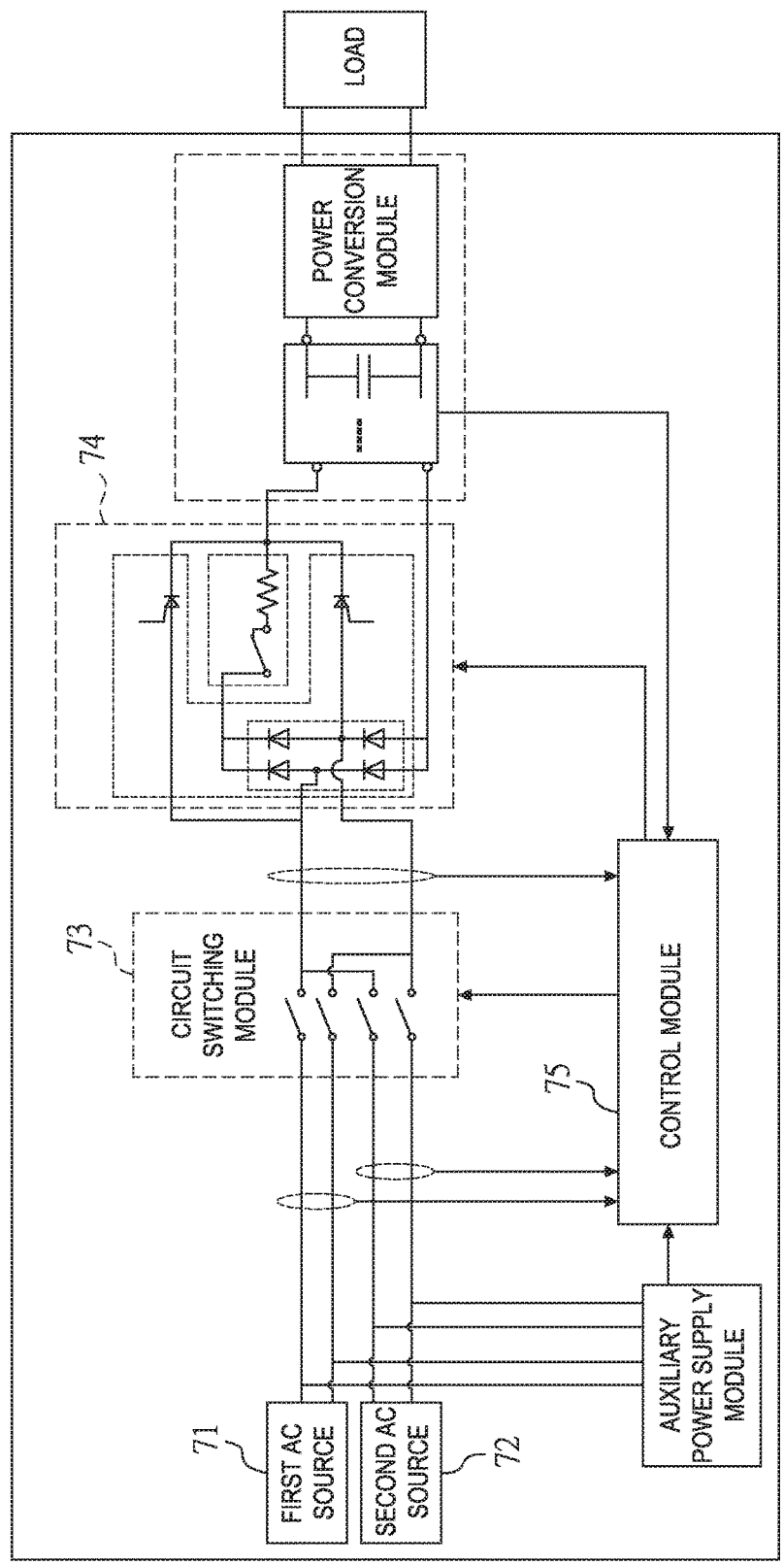
FIG. 9 is another circuit block diagram of the conventional power supply system.
Figure 10:
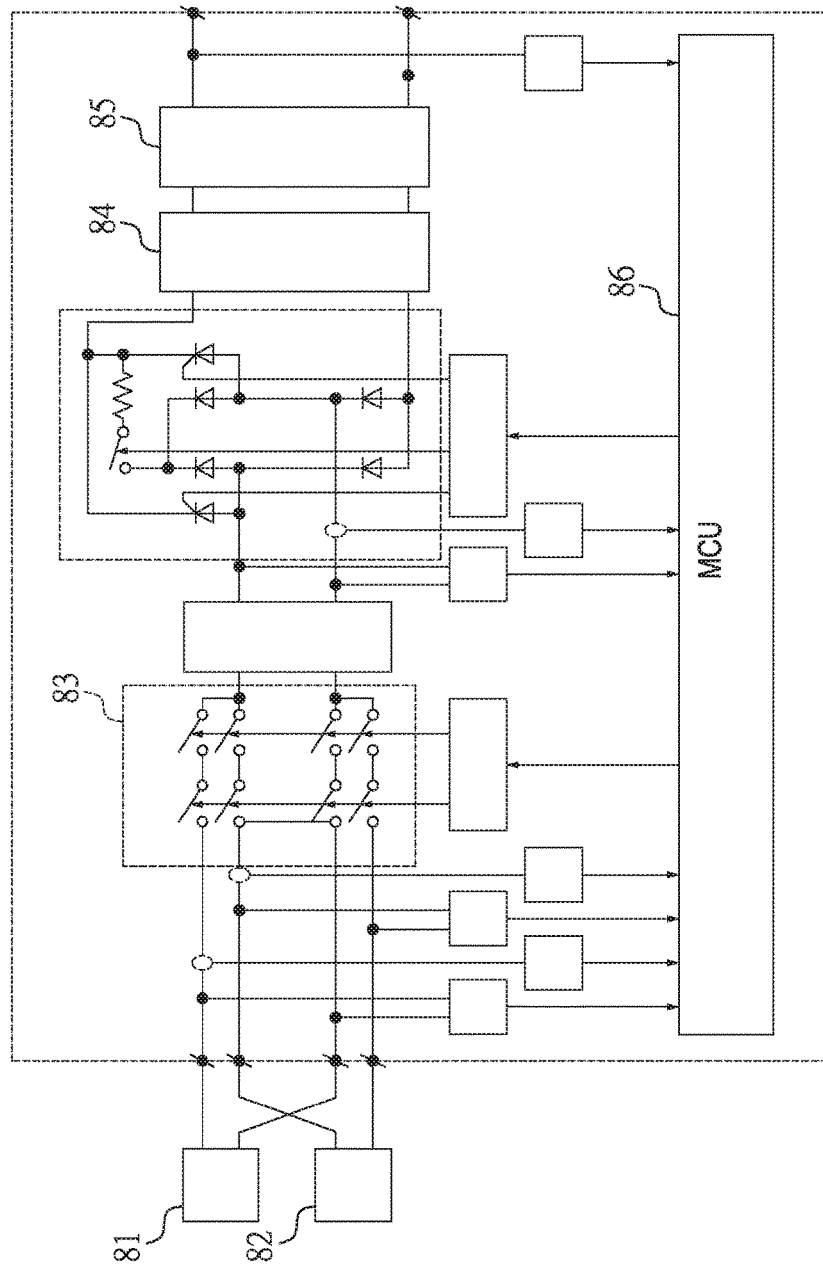
FIG. 10 is a circuit block diagram of a conventional uninterruptable power supply.
Figure 11:
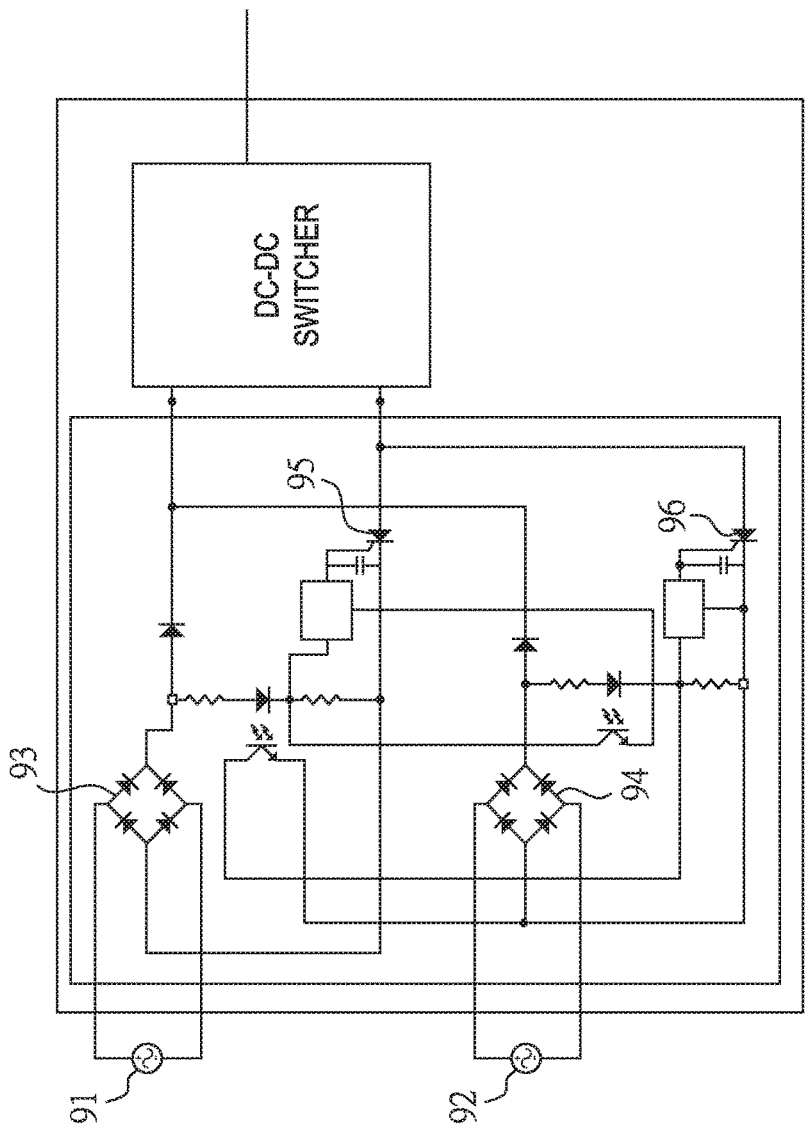
FIG. 11 is a circuit block diagram of a conventional low cost redundant AC to DC power supply.

The redundant power supply apparatus 100 further includes a common capacitor 422 and a non-isolated DC/DC converter 423 connected to the common capacitor 422 in series. The common capacitor 422 is connected to the first isolated PFC circuit 411 and the second isolated PFC circuit 421. In this embodiment, the common capacitor 422 is the common component 60 for storing energy outputted from the first power supply unit 11 and the second power supply unit 12. The input side of the common capacitor 422 is commonly connected to the output sides of the two isolated PFC circuits 411, 421. The output side of the common capacitor 422 is connected to the input side of the non-isolated DC/DC converter 423 to prove that the regulated the DC output voltage Vo is to power the load 50. For example, the non-isolated DC/DC converter 423 may be a buck converter as shown in FIG. 6B. The output side of the non-isolated DC/DC converter 423 is an output side of the redundant power supply apparatus 100 to provide a DC output voltage Vo to supply power to the load 50.

Further, a common secondary-side control 424 is provided. The common secondary-side control 424 is coupled to the first isolated PFC circuit 411, the second isolated PFC circuit 421, and the non-isolated DC/DC converter 423. The common secondary-side control 424 is used to control the non-isolated DC/DC converter 423 to regulate the DC output voltage Vo. Further, the common secondary-side control 424 further controls the first isolated PFC circuit 411 and the second isolated PFC circuit 421 in PWM manners according to the received voltage, such as a common feedback output voltage.

The safety isolation from one power source to the other power source is by means of a fully safety isolated transformer as opposed to mechanical or electrical switches, further enhancing the operator safety in the installation and operation of the present disclosure. The common capacitor 422 required provides interim energy storage for loss of input power either through transitions from one active line to another or due to reduction in total of normal expected disturbances to the input power.

The prior arts all require additional capacitors in total due to the transfer switch time and the inability to share the 'hold up' or buck high voltage capacitors. In this embodiment, it allows a reduction of the hold up capacitor for each AC to DC section to be reduced by a significant cost and size reduction.

For example, it is assumed that a rated output power of the first power supply unit 11 is 2000 watts and also a rated output power of the second power supply unit 12 is 2000 watts for supplying power to the load 50. In addition, it is assumed that the common secondary-side control 424 of the redundant power supply apparatus 100 is provided to control the first power supply unit 11 such that the first AC power source AC1 is converted by the first power supply unit 11 and then transmitted to the common output side and finally outputted via the common capacitor 422 and the non-isolated DC/DC converter 423 to supply power to the load 50.

At this time, the common secondary-side control 424 controls the second power supply unit 12 in a standby state such that the second AC power source AC2 is not completely converted by the second power supply unit 12, thus failing to be transmitted to the common output side. Therefore, the load 50 is supplied by the first power supply unit 11 rather than the second power supply unit 12.

When the first AC power source AC1 fails (losing power), the second power supply unit 12 jointly supplies power to the load 50. In this situation, the common secondary-side control 424 controls the second power supply unit 12 such that the second AC power source AC2 is converted by the second power supply unit 12 and then transmitted to the common output side and finally outputted via the common capacitor 422 and the non-isolated DC/DC converter 423 to supply power to the load 50. At this time, the common secondary-side control 424 controls the first power supply unit 11 in a standby state such that the first AC power source AC1 is not completely converted by the first power supply unit 11, thus failing to be transmitted to the common output side. Therefore, the load 50 is supplied by the second power supply unit 12 rather than the first power supply unit 11.

For example, the redundant power supply apparatus 100 may be operated when both the first AC power source AC1 and the second AC power source AC2 are normal. Both the first power supply unit 11 and the second power supply unit 12 may provide an output power between 0 and 100% of the rated output power thereof. By power sharing of the first AC power source AC1 and the second AC power source AC2, the first power supply unit 11 and the second power supply unit 12 jointly provide the required power for the load 50 according to the power contribution thereof.

Further, either the first power supply unit 11 or the second power supply unit 12 may provide its output power for the load 50 by controlling an OR'ing switch thereof when both the first AC power source AC1 and the second AC power source AC2 are normal. The second power supply unit 12 is operated under a standby mode when the first power supply unit 11 is operated to output power, and vice versa.

For example, a semiconductor switch of the first isolated PFC circuit 411 is controlled in a switching operation and a semiconductor switch of the second isolated PFC circuit 421 is controlled in a turn-off state, thereby completely supplying power to the load 50 by the first power supply unit 11. In contrast, the semiconductor switch of the second isolated PFC circuit 421 is controlled in a switching operation and the semiconductor switch of the first isolated PFC circuit 411 is controlled in a turn-off state, thereby completely supplying power to the load 50 by the second power supply unit 12.

In addition, the semiconductor switch of the first isolated PFC circuit 411 and the semiconductor switch of the second isolated PFC circuit 421 are both controlled in the switching operations, thereby jointly supplying power to the load 50 by the first and second power supply units 11, 12.

In the above-mentioned embodiments of the present disclosure, the common energy-storing components, such as the capacitive component or the inductive component, are provided to implement the redundant power applications. In addition, the present disclosure may further provide a common control topology. In other words, a secondary-side control is shared for commonly controlling secondary-side switches so that the secondary-side switches are controlled by the same controller.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A redundant power supply apparatus, comprising:
at least two power inlets, each power inlet connected to an alternating current (AC) power source;
at least two power supply units, each power supply unit having an input side and the at least two power supply units having a common output side, each input side connected to the power inlet, each power supply unit configured to convert the AC power source into a direct-current (DC) power source; and
a common component connected at the common output side and configured to receive the DC power sources; wherein
the common component is a secondary-side core of a transformer; wherein
each power supply unit comprises a DC/DC converter having an input side and an output side; the input side of the DC/DC converter is coupled to a primary-side core of the transformer, and the output side of the DC/DC converter is commonly coupled to the secondary-side core of the transformer.

2. The redundant power supply apparatus as claimed in claim 1, wherein the DC/DC converter is an LLC converter, a step-down converter, or a step-up converter.

3. The redundant power supply apparatus as claimed in claim 1, wherein each power supply unit further comprises a power factor correction (PFC) circuit, and the PFC circuit is connected to the input side of the DC/DC converter.

4. The redundant power supply apparatus as claimed in claim 2, wherein each power supply unit further comprises a power factor correction (PFC) circuit, and the PFC circuit is connected to the input side of the DC/DC converter.

5. The redundant power supply apparatus as claimed in claim 1, wherein when any one of the AC power sources fails, any one of the at least two power supply units connected to other AC power sources is configured to convert the AC power source into the DC power source.

6. The redundant power supply apparatus as claimed in claim 1, wherein when all AC power sources are normal, any one of the at least two power supply units is configured to convert the AC power source into the DC power source.

7. The redundant power supply apparatus as claimed in claim 1, wherein the at least two power inlets, the at least two power supply units, and the common component are modularized in a single enclosure.

8. The redundant power supply apparatus as claimed in claim 1, further comprising at least two control units, each control unit configured to control the corresponding power supply unit.

9. The redundant power supply apparatus as claimed in claim 8, further comprising a main control unit configured to control the at least two control units.

10. The redundant power supply apparatus as claimed in claim 1, further comprising a main control unit configured to commonly control the at least two power supply units.

11. The redundant power supply apparatus as claimed in claim 1, wherein
each of the DC/DC converters has a first inductor and a second inductor;
the first inductors and the second inductors are wound on a common ferrite core of the transformer;
the first inductors are connected to the input sides of the at least two power supply units; and
each second inductor is connected to the common output side of the at least two power supply units.

* * * * *